US012565959B1

(12) United States Patent
Cantolino

(10) Patent No.: US 12,565,959 B1
(45) Date of Patent: Mar. 3, 2026

(54) THREADED ADAPTER SEAL

(71) Applicant: DiversiTech Corporation, Duluth, GA (US)

(72) Inventor: Christopher Cantolino, Bradenton, FL (US)

(73) Assignee: DiversiTech Corporation, Duluth, GA (US)

( * ) Notice: Subject to any disclaimer, the term of this patent is extended or adjusted under 35 U.S.C. 154(b) by 156 days.

(21) Appl. No.: 17/824,999

(22) Filed: May 26, 2022

Related U.S. Application Data

(63) Continuation-in-part of application No. 17/543,686, filed on Dec. 6, 2021, now Pat. No. 11,749,478, which is a continuation-in-part of application No. 16/873,260, filed on Mar. 6, 2020, now Pat. No. 11,322,323.

(60) Provisional application No. 62/856,620, filed on Jun. 3, 2019.

(51) Int. Cl.
| | |
|---|---|
| *F16L 47/16* | (2006.01) |
| *F16L 15/00* | (2006.01) |
| *F24F 13/22* | (2006.01) |
| *H01H 36/02* | (2006.01) |

(52) U.S. Cl.
CPC ............. *F16L 47/16* (2013.01); *F16L 15/008* (2013.01); *F24F 13/22* (2013.01); *H01H 36/02* (2013.01)

(58) Field of Classification Search
CPC ....... F16L 15/008; F16L 47/16; F24F 13/222; F24F 2013/227; F24F 11/89; F24F 13/22; H01H 36/02

USPC ............................... 285/355; 202/84 R, 84 C
See application file for complete search history.

(56) References Cited

U.S. PATENT DOCUMENTS

| | | | |
|---|---|---|---|
| 2,769,649 A | * 11/1956 | Scully | B60K 15/04 |
| | | | 277/622 |
| 3,052,778 A | 9/1962 | Kathe | |
| 3,074,748 A | * 1/1963 | Ulrich | F16L 15/008 |
| | | | 285/212 |

(Continued)

FOREIGN PATENT DOCUMENTS

WO        WO2006052250 A1        5/2006

*Primary Examiner* — David Bochna
(74) *Attorney, Agent, or Firm* — Dentons US LLP

(57) ABSTRACT

A threaded adapter seal comprising fitting and sealing components for fluid transport applications. Opposed gripping and externally-threaded sections in the fitting component each have hollow interiors, and reduced interior and exterior diameter dimensions of the externally-threaded section compared to the gripping section, provide an interior stop separating the fitting component sections and also provide a radially-extending exterior surface therebetween where an indent is present to improve leak-reducing placement, fit, and performance of the sealing component after threaded adapter seal installation is complete. Improved seating and fit of the sealing component prevent overtightening thread damage during installation. Use of a non-standard thread angle for the externally-threaded section in the range of 1.75 to 4 degrees does also. Contemplated use of the threaded adapter seal includes connection of fluid-bearing tubular components, extension tubing, and/or fluid-activated shut-off switches where the addition of a separable threaded connection is desired for maintenance or replacement purposes.

18 Claims, 7 Drawing Sheets

(56)                  References Cited

U.S. PATENT DOCUMENTS

| | | | | | |
|---|---|---|---|---|---|
| 3,173,712 | A | * | 3/1965 | Zahuranec | F16L 15/008 |
| | | | | | 285/349 |
| 3,273,091 | A | | 9/1966 | Wales, Jr. | |
| 3,499,670 | A | * | 3/1970 | Woody | F16L 47/16 |
| | | | | | 285/911 |
| 3,695,642 | A | * | 10/1972 | DeWoody | F16L 47/20 |
| | | | | | 285/911 |
| 3,722,924 | A | * | 3/1973 | Bjornsen | F16L 47/16 |
| | | | | | 285/55 |
| 3,743,980 | A | | 7/1973 | Steiner | |
| 4,056,979 | A | | 11/1977 | Bongort | |
| 4,150,836 | A | * | 4/1979 | Walker | F16L 41/10 |
| | | | | | 285/212 |
| 4,489,297 | A | | 12/1984 | Haydon | |
| 4,531,767 | A | * | 7/1985 | Andreolla | F16L 15/008 |
| | | | | | 285/349 |
| 4,838,491 | A | * | 6/1989 | Bennett | F16L 47/20 |
| | | | | | 239/690 |
| 4,934,742 | A | * | 6/1990 | Williamson | F16L 15/008 |
| | | | | | 285/212 |
| 6,140,925 | A | | 10/2000 | Lee | |
| 6,442,955 | B1 | | 9/2002 | Oakner | |
| 6,550,264 | B1 | | 4/2003 | Cantolino | |
| 6,701,740 | B1 | * | 3/2004 | Hernandez-Zelaya | |
| | | | | | F24F 13/222 |
| | | | | | 62/291 |
| 6,895,771 | B1 | | 5/2005 | Cantolino | |
| 6,992,259 | B1 | * | 1/2006 | Cantolino | H01H 35/18 |
| | | | | | 200/84 R |
| 6,992,260 | B1 | | 1/2006 | Cantolino | |
| 7,067,750 | B1 | | 6/2006 | Cantolino | |
| D527,793 | S | | 9/2006 | Cantolino | |
| D562,963 | S | | 2/2008 | Cantolino | |
| 7,334,421 | B1 | | 2/2008 | Cantolino | |
| 7,389,651 | B2 | | 6/2008 | Cantolino | |
| 7,588,253 | B2 | * | 9/2009 | Bottura | F16L 41/10 |
| | | | | | 277/609 |
| 7,637,387 | B1 | | 12/2009 | Cantolino | |
| 7,673,646 | B1 | | 3/2010 | Cantolino | |
| 7,710,283 | B1 | | 5/2010 | Cantolino | |
| 7,744,395 | B1 | | 6/2010 | Cantolino | |
| D630,709 | S | | 1/2011 | Cantolino | |
| 7,878,019 | B2 | | 2/2011 | Cantolino | |
| 7,896,301 | B1 | | 3/2011 | Cantolino | |
| 7,900,795 | B1 | | 3/2011 | Cantolino | |
| 7,967,267 | B1 | | 6/2011 | Cantolino | |
| 8,100,140 | B1 | | 1/2012 | Cantolino | |
| 8,151,621 | B1 | | 4/2012 | Cantolino | |
| 8,154,313 | B1 | | 4/2012 | Cantolino | |
| 8,169,314 | B2 | | 5/2012 | Cantolino | |
| 8,220,768 | B1 | | 7/2012 | Cantolino | |
| 8,317,169 | B1 | | 11/2012 | Cantolino | |
| 8,319,626 | B1 | | 11/2012 | Cantolino | |
| 8,461,493 | B1 | | 6/2013 | Cantolino | |
| 8,561,417 | B1 | | 10/2013 | Cantolino | |
| 8,578,770 | B2 | | 11/2013 | Cantolino | |
| 8,844,353 | B2 | | 9/2014 | Hsiao | |
| 8,973,437 | B2 | | 3/2015 | Cantolino | |
| 9,038,405 | B2 | | 5/2015 | Cantolino | |
| 9,105,175 | B1 | | 8/2015 | Cantolino | |
| 9,217,577 | B2 | * | 12/2015 | Oakner | F16L 45/00 |
| 9,249,981 | B2 | | 2/2016 | Sada | |
| 9,503,015 | B2 | | 11/2016 | Cantolino | |
| 11,322,323 | B1 | | 5/2022 | Cantolino | |
| 11,749,478 | B1 | * | 9/2023 | Cantolino | H01H 9/02 |
| | | | | | 335/205 |
| 2005/0156130 | A1 | * | 7/2005 | Vasilev | F16K 15/02 |
| | | | | | 251/148 |
| 2005/0166613 | A1 | | 8/2005 | Oakner | |
| 2006/0042918 | A1 | | 3/2006 | Cantolino | |
| 2006/0096307 | A1 | * | 5/2006 | Coogle | F24F 13/222 |
| | | | | | 62/272 |
| 2006/0163870 | A1 | * | 7/2006 | Goilot | F16L 15/008 |
| | | | | | 285/143.1 |
| 2006/0222508 | A1 | | 10/2006 | Cantolino | |
| 2009/0304968 | A1 | * | 12/2009 | De Palo | B32B 1/08 |
| | | | | | 524/427 |
| 2011/0181380 | A1 | | 7/2011 | Iwata | |
| 2012/0053736 | A1 | | 3/2012 | Cantolino | |
| 2012/0219428 | A1 | | 8/2012 | Cantolino | |
| 2014/0008253 | A1 | | 1/2014 | Cantolino | |
| 2014/0102123 | A1 | | 4/2014 | Cantolino | |
| 2014/0319153 | A1 | * | 10/2014 | Porterfield | F16J 12/00 |
| | | | | | 220/581 |
| 2015/0000193 | A1 | | 1/2015 | Cantolino | |
| 2015/0082697 | A1 | | 3/2015 | Cantolino | |

* cited by examiner

THREADED ADAPTER SEAL

CROSS-REFERENCES TO RELATED APPLICATIONS

This patent application is a Continuation-In-Part of Ser. No. 17/543,686 filed Dec. 6, 2021, which is a Continuation-In-Part of U.S. utility patent application Ser. No. 16/873,260 filed Mar. 6, 2020, now U.S. Pat. No. 11,322,323 issued May 3, 2022, which claims a benefit of U.S. provisional patent application 62/856,620 filed Jun. 3, 2019, each of which is herein incorporated by reference in its entirety for all purposes.

BACKGROUND OF THE INVENTION

Field of the Invention

The invention herein relates to the field of plastic pipe fittings, specifically to a threaded adapter seal that comprises two related but independent constituents, an adaptive fitting component preferably of molded construction (hereinafter referred to as fitting component) and a sealing component, such as an O-ring. In the most preferred embodiments of the present invention, the sealing component is illustrated as a circular O-ring, but it is not be contemplated for the circular configuration shown in the accompanying illustrations to be a limiting factor in the invention disclosure herein, as long as the sealing component and the fitting component together are configured and able to fulfill the goal of providing a long-lasting and leak-resistant connection with pipe, conduit, a fluid collection pan drain opening, a drain line, or other structure where an easily detached and promptly reattached connection involving fluid transport would be beneficial. The most preferred embodiment of the present invention fitting component herein has unitary construction with its two opposed and visibly distinct sections (gripping section and externally-threaded section) axially aligned with one another and each having a hollow interior allowing fluid flow therethrough. One section has a non-threaded and slightly tapered interior surface, as well as a non-tapered exterior surface configured and/or textured for use as a gripping surface to assist in secure threaded connection of the threaded adapter seal invention during its installation into a desired position of use. In contrast, the most preferred embodiment of the opposed externally-threaded section of the fitting component has a hollow, smooth-walled, and tapered interior, as well as a threaded, tapered exterior surface with a preferred thread angle in the range of 1.75 to 4 degrees, which contemplates use with opposing female threads present at an installation site having a standard thread angle of 1.73 degrees. Then, in applications with differing risk potential for fluid leakage in a threaded connection (for example, a likelihood of installer overtightening), as well as during connections of the present invention with pipe made from materials having differing impact resistance, thermal expansion rate, creep rate, and/or amount of filler different from that used to manufacture the present invention, instead of using a standard thread angle matching that of the female threads intended for its engagement, the thread angle in the externally-threaded section of the present invention fitting component can be selected in the range of 1.75 to 4 degrees (as best determined in advance to eliminate gaps that might otherwise be created during present invention installation and thereafter have potential to grow during continued present invention use at the installation site, and over time conceivably lead to sudden and/or unwanted leakage in the threaded connection. As shown in the accompanying invention illustrations, the length dimension of the threaded section exceeds that of the gripping section, however, such dimension choice should be considered more as a factor affecting case of hand-manipulation and material cost, but not as a limiting factor of present invention function. However, the external diameter dimension of the gripping section will always exceed that of the externally-threaded section for two reasons. First, the larger diameter of the gripping section allows a portion of the interior end of the externally-threaded section to become a limiting surface that aids present invention installation by allowing insertion of the leading end of a connective fitting or pipe at the installation site fully into the hollow interior of the gripping section while preventing its insertion beyond the limiting surface. Second, the larger diameter gripping section provides an exterior radially-extending surface between the two sections where an undercut, depression, or indent (hereinafter primarily referred to as indent) is formed to improve the placement, fit, and performance of any sealing component used after installation of the threaded adaptor seal has been completed. Improved fit of a sealing component between and against the preferably curved indent, the portions of the radially-extending surface into which the curved indent is formed that are adjacent to the curved indent, a small portion of the externally-threaded section bordering and contiguous with the radially-extending surface, as well as the proximal end of the additional tubing with female threads (or other connected fitting/member at the installation site) that becomes mated to or against the externally-threaded section, together with the O-ring (or other sealing component used) collectively secure the O-ring (or other sealing component employed) to prevent seal blow-out to one side should the threaded section become overtightened during threaded adapter seal installation. In addition to benefit related to torque issues, the present invention may also provide advantages relating to other failure-accelerating issues relating to joints involving plastic threads, such as thermal expansion and contraction, creep rate in materials that can lead to permanent deformation, and issues relating to the fillers or stiffeners used for the female threads that become mated to the externally-threaded section of the threaded adapter seal herein. Adjustment of the fitting component's thread angle and taper when mated to standard NPT threads to overcome anticipated risk of failure in certain intended applications of the present invention, reduces a risk of installation damage to mating surfaces by overaggressive installers who might inadvertently overtighten threaded connections believing that better leak protection will ensue. Some contemplated uses of the threaded adapter seal disclosed herein are connection of fluid-bearing tubular components, tubular extensions, other fluid-bearing devices, and/or fluid detectors, fluid-activated alarms, and/or fluid-activated shut-off switches in places where the addition of a rugged and secure threaded connection is needed or required for contemplated routine maintenance or repair/replacement purposes, and prompt/simple separation and subsequent replacement by hand-manipulation is also desired.

BACKGROUND OF THE INVENTION

Description of the Related Art

Tubing extensions, fluid detectors, fluid-activated alarms, and fluid-activated shut-off switches are often used at equipment installation sites involving fluid or condensate transport to adapt needed tubing configurations so they provide optimum fit with the unique requirements present at each site, and/or optionally to simplify and ease anticipated maintenance and repair/replacement activity that may be required during long term use. Installation of air conditioning systems is one such example that can potentially involve configurational challenges for fluid and condensate transport, and a need for installation of fluid-activated alarms or switches to shut-off fluid production, devices which are likely to require maintenance, repair, or replacement at least once during the operational life of the air conditioning system. A permanent connection of extensions and monitoring devices can be made with bonding materials, but some applicable building Codes require threaded connections, which for many reasons can be subject to leaks. Premature failure of connections involving PVC/plastic tubing can be influenced by a variety of factors, such as extreme weather and over-tightening of components during installation. While prior art tubing pieces held together with connectors that are permanently bonded to them do have a high expectation of leak resistance, permanent bonding may become a disadvantage when periodic maintenance activity or replacement of associated components (such as an A/C system shut-off float switch) is foreseeable, as the labor and material cost for the maintenance, repair, or replacement would be high. Use of the threaded adapter seal herein is rugged in design, can be securely installed, and is easily and repeatedly separable and reconnected according to need via hand manipulation, and also its structural features allow a greater range of adaptation to differing environments than currently known fittings and components used in the same or similar applications. The present invention fitting component indent also improves placement, fit, and performance of its sealing component (such as an O-ring) after adaptor component installation, and when fit of the O-ring or other sealing component is improved, its blow out is prevented when the threaded section unintentionally becomes overtightened during its installation. The tapered design of the fitting component of the present invention further reduces the risk of installation damage to mating surfaces should overtightening occur, and a preferred thread angle of the external threads on the fitting component in the range of 1.75 to 4 degrees contemplates use with opposing female threads present at an installation site having a standard thread angle of 1.73 degrees to fill in anticipated gaps and other irregularities that could worsen and cause fluid leakage from the connection after installation. The combination of benefits and advantages provided by the present invention threaded adaptor seal herein are not presently known in the prior art.

SUMMARY OF THE INVENTION

The primary objective of this invention is to provide a threaded adapter seal for use with systems involving fluid or condensate transport that is easily detachable-upon demand from an existing threaded connection involving female threads present at the installation site and then easily and quickly connectable to the same (or a replacement fitting/component) according to need. It is also a further object of this invention to provide a threaded adapter seal allowing easier/faster maintenance activity and/or component part repair or replacement. It is also an objective of this invention to provide a threaded adapter seal with an exterior gripping section configured and sized for hand-manipulation. A further object of this invention is to provide a threaded adapter seal with at least one structural design feature that helps to improve the placement, fit, and performance of an associated sealing member or component after threaded adaptor seal installation, thus preventing blow out of associated O-rings and/or other sealing members. It is also an objective of this invention to provide a threaded adapter seal with tapered design and/or thread angle adaptation that reduces a risk of installation damage to mating surfaces should overtightening of the threaded adapter seal occur while being joined with tubing or other component present at an installation site having female threads with a standard thread angle. A further object of this invention is to provide a rugged, secure, and leakproof threaded connection for fluid and condensate transport applications that lowers labor and material costs for inspection, maintenance, repair, and/or replacement of components during replacement activity involving shut-off switches and other monitoring components during their association with the threaded adapter seal herein. In addition, it is an objective of this invention to provide a fitting made from rugged materials able to withstand temperature extremes and resist premature deterioration for long term use.

The present invention is a threaded adapter seal comprising a fitting component of unitary construction and a sealing component, the fitting component having a gripping section and an opposed externally-threaded section each axially aligned with one another The external diameter dimension of the gripping section exceeds that of the opposed externally-threaded section, providing a radially-extending surface between the two sections where an indent is present to improve placement, fit, and performance of the sealing component after fitting component installation. The sealing component is preferably a circular O-ring, with the indent having a size and outline/arrangement corresponding to that of the sealing component. However, it is contemplated to be within the scope of this invention for the sealing component and indent to have other non-circular configurations, such as but not limited to hexagonal, octagonal, or square, as long as together they can fulfill the same function and provide non-leak benefits comparable to (or better than) that of circular O-ring. Improved sealing component fit prevents its blow-out should the threaded section of the fitting component become overtightened during installation, which is a common tendency of installers attempting to prevent fluid leaks in a new connection. The fitting component's tapered design and lower thread count also reduces a risk of installation damage to plastic mating surfaces should overtightening occur, particularly when plastic materials in a connection are not the same and the installation site is subject to temperature extremes that can accelerate premature failure of otherwise stressed plastic material. One contemplated use of the threaded adapter seal is connection of fluid-bearing tubular components, extensions, and other fluid-bearing devices where the addition of a separable threaded connection is desired for maintenance or replacement purposes. Among its other benefits and advantages, the present invention disclosed herein will always have an indent in a radially-extending surface between its gripping and threaded sections to improve the placement, fit, and performance of the sealing component that becomes associated with the indent during threaded adaptor seal installation. The contemplated non-standard thread angle of the externally-threaded section of the fitting component also contributes to the leak-prevention success of the present invention threaded adapter seal herein. The combination of advantages and benefits provided by the present invention structure disclosed herein are not currently known in the prior art.

BRIEF DRAWING DESCRIPTIONS

FIG. 1 is an exploded perspective view from one of the opposing ends of a first preferred embodiment of the present threaded adapter seal invention, which shows the O-ring component thereof separated from its intended position of use against a curved indent in the radially-extending surface between the larger diameter gripping section and the smaller diameter threaded section of the fitting component.

Figure 1:
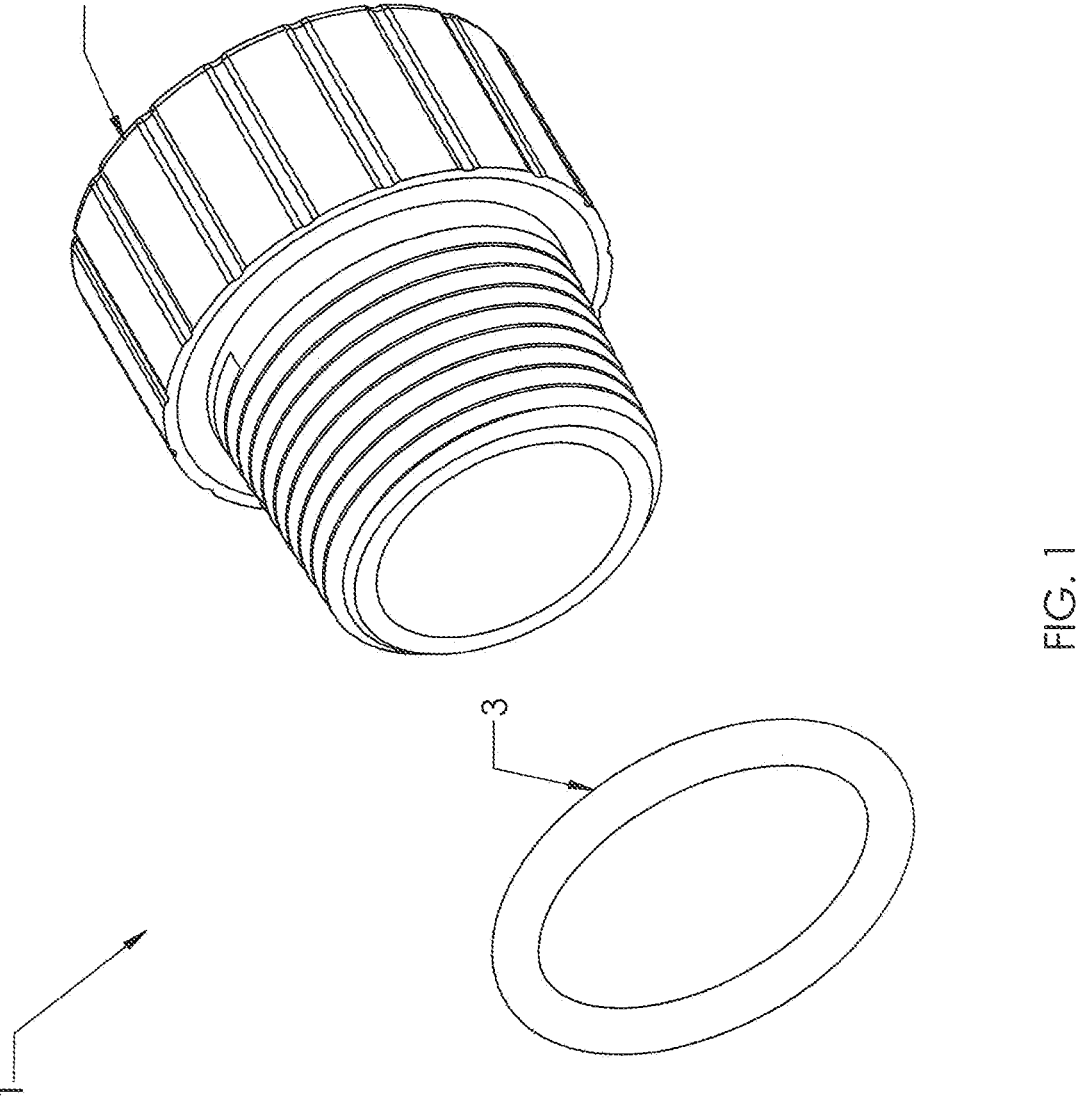
Figure 2:
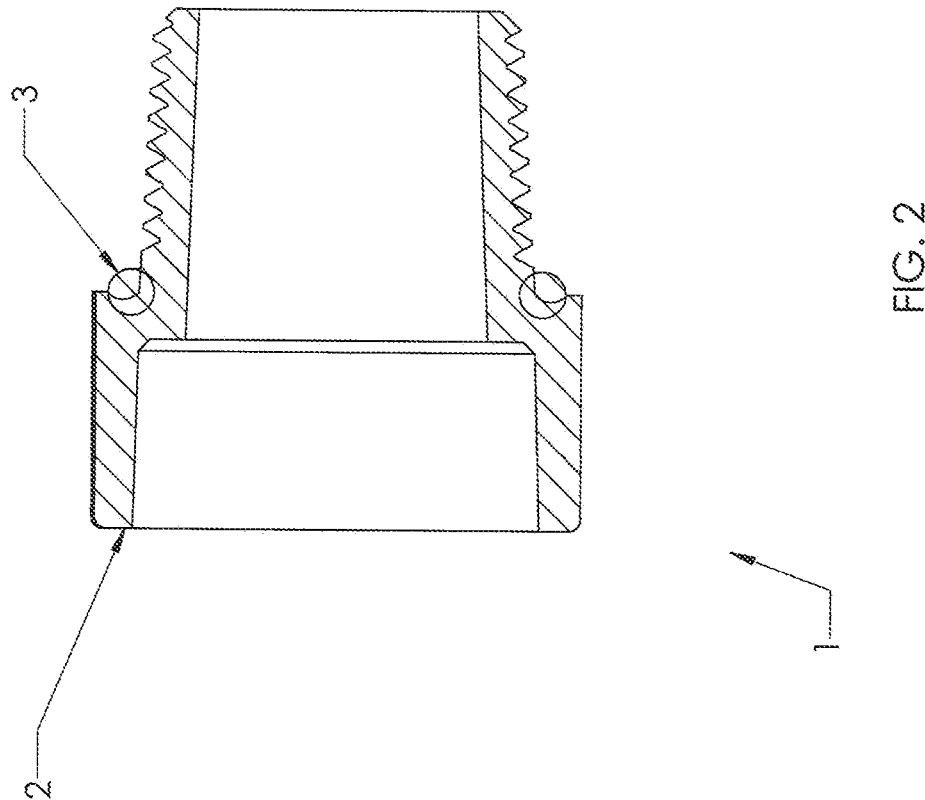
FIG. 2 is a side section view of the fitting component of the first preferred embodiment in FIG. 1, with two circles between the smaller diameter externally-threaded section and the larger diameter gripping section each on a different opposing side of the adaptor component indicating the intended O-ring positioning.
Figure 3:
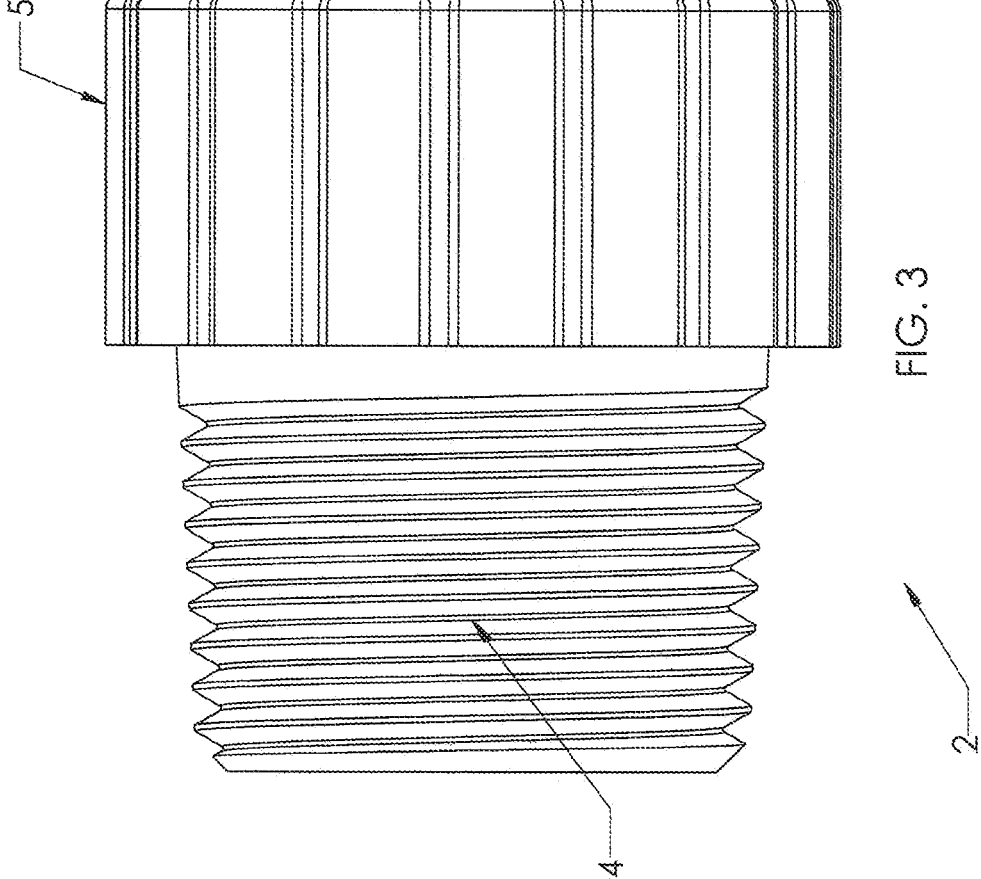
FIG. 3 is an enlarged side view of the fitting component of the first preferred embodiment shown in FIGS. 1-2.
Figure 4:
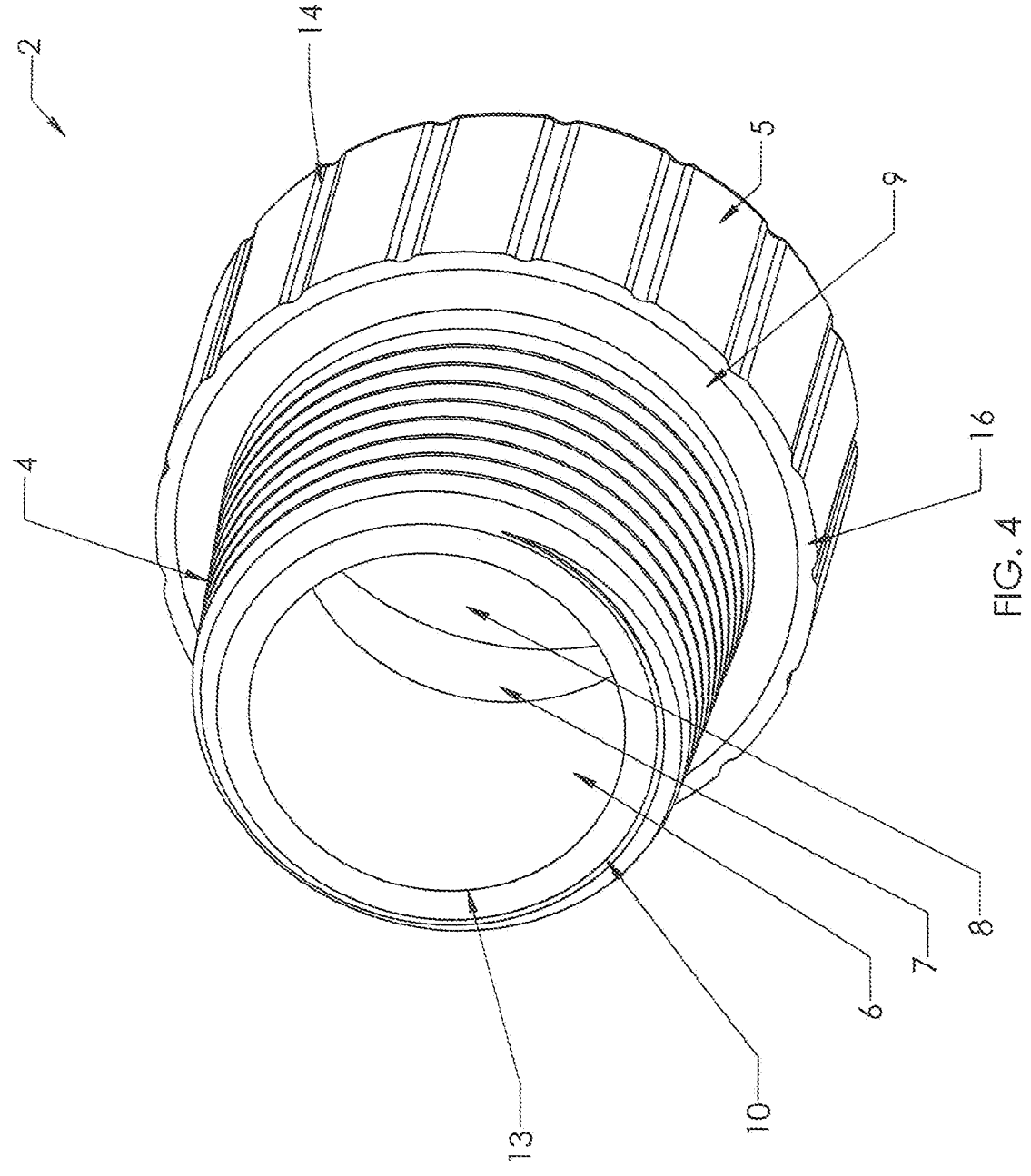

FIG. 4 is a perspective view of the externally-threaded end of the fitting component of the first preferred embodiment in FIGS. 1-3, that shows the externally-threaded section having a smaller diameter dimension than that of the gripping section, and also identifies the distal end surface of its threaded section and the opening through it, the smooth interior walls of the externally-threaded and gripping sections, the curved indent radially-extending between the fitting's gripping section and the externally-threaded section, multiple exterior ridges on the gripping section, and the opening through the top surface of the gripping section.

Figure 5:
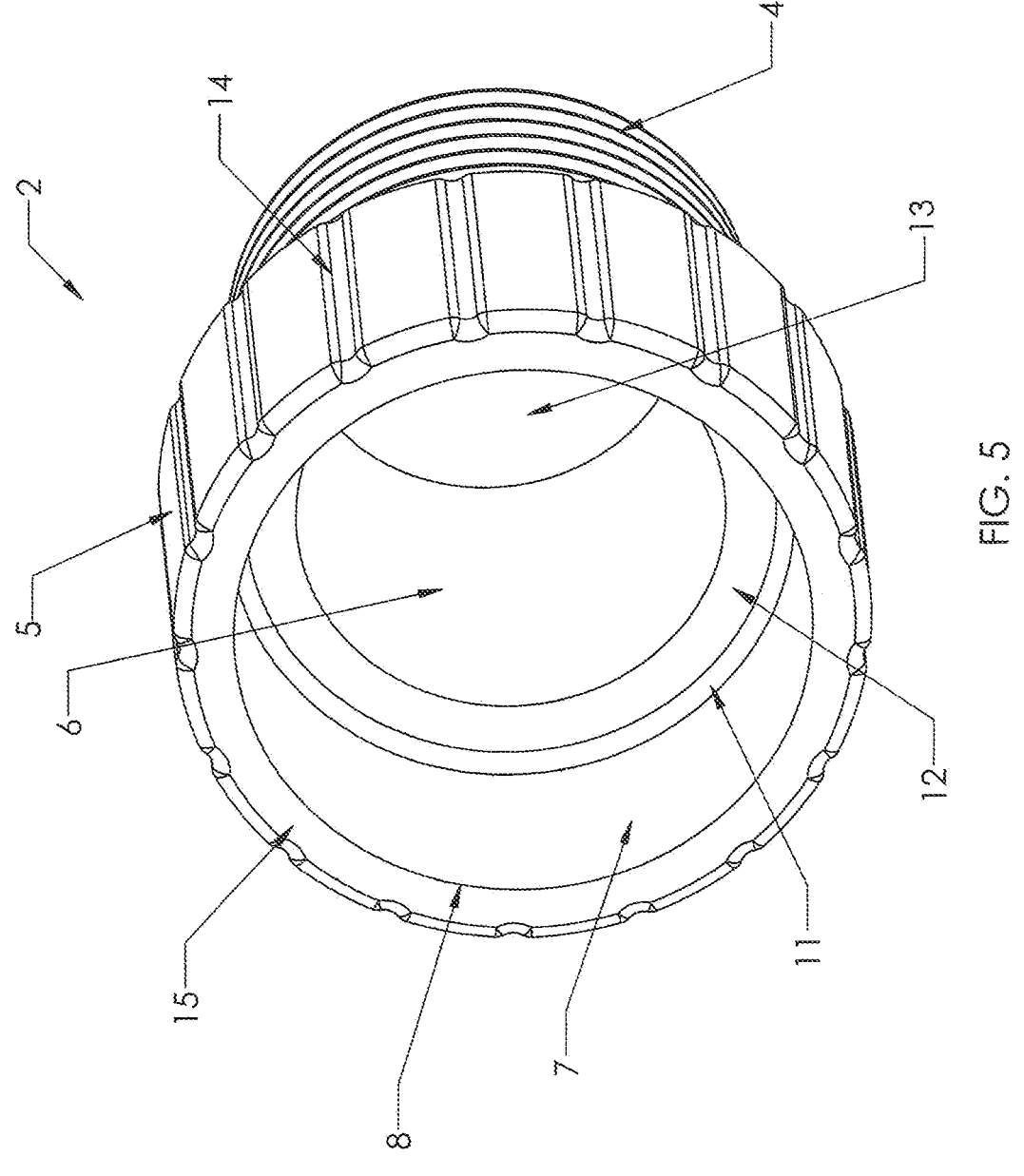

FIG. 5 is a perspective view of the gripping end of the first preferred embodiment of the adapter in FIGS. 1-4, that shows the gripping section having a larger diameter dimension than that of the externally-threaded section, and also identifies the distal end surface of its gripping section and the opening through it, the smooth interior walls in the gripping and externally-threaded sections, the proximal end of the fitting's externally-threaded section (visible due to the diameter dimension difference between the externally-threaded and gripping sections), an angled surface between the proximal end and the smooth interior wall of the gripping section, multiple exterior ridges on the exterior of the gripping section, the opening through the bottom surface distal end of the externally-threaded section, and a small exterior component of the fitting's threaded section visible to the right of the exterior ridges.

Figure 6:
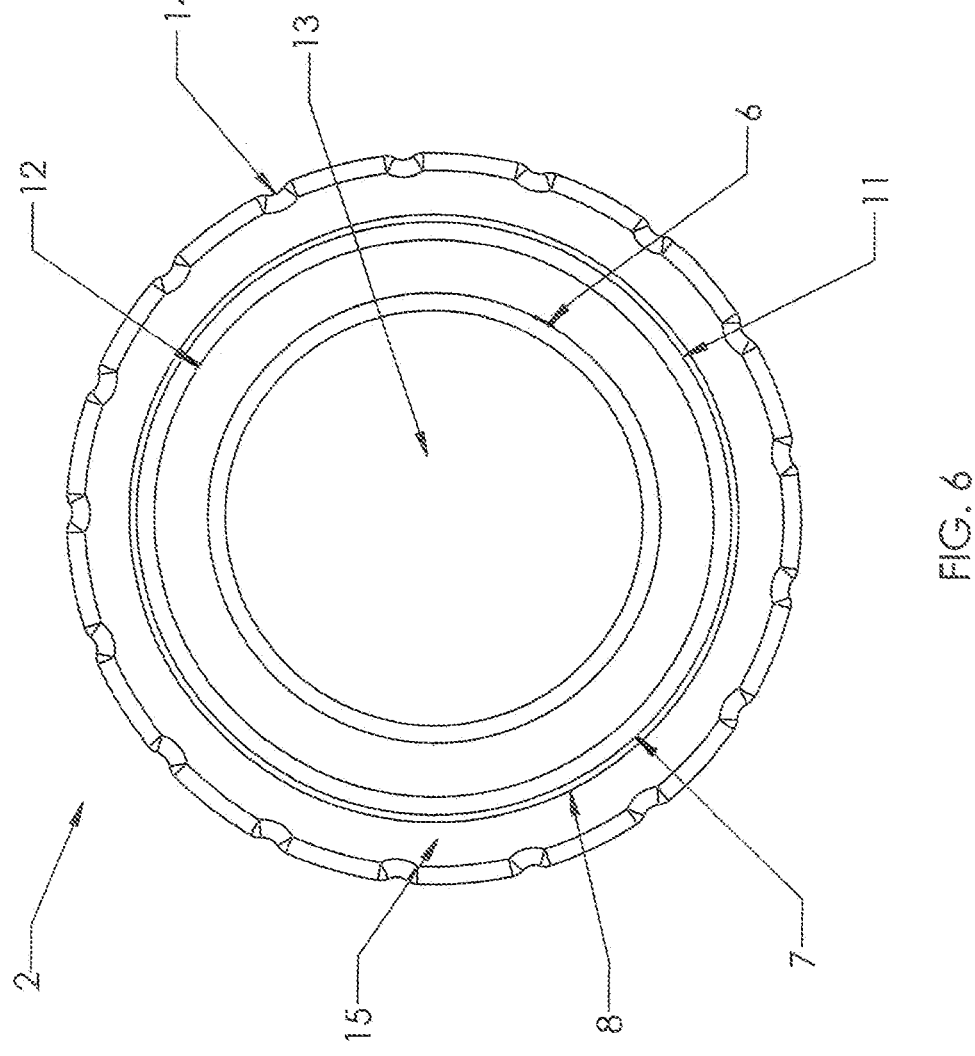

FIG. 6 is an end view of the first preferred embodiment of the fitting in FIGS. 1-5, showing the top surface of its gripping section and the opening through it, the smooth and downwardly-tapered interior walls of the gripping section and the threaded section, the distal end of the fitting's threaded section, an angled surface between the distal end and the smooth interior wall of the gripping section, multiple exterior ridges associated with the gripping section, and the opening through the distal end of the externally-threaded section.

Figure 7:
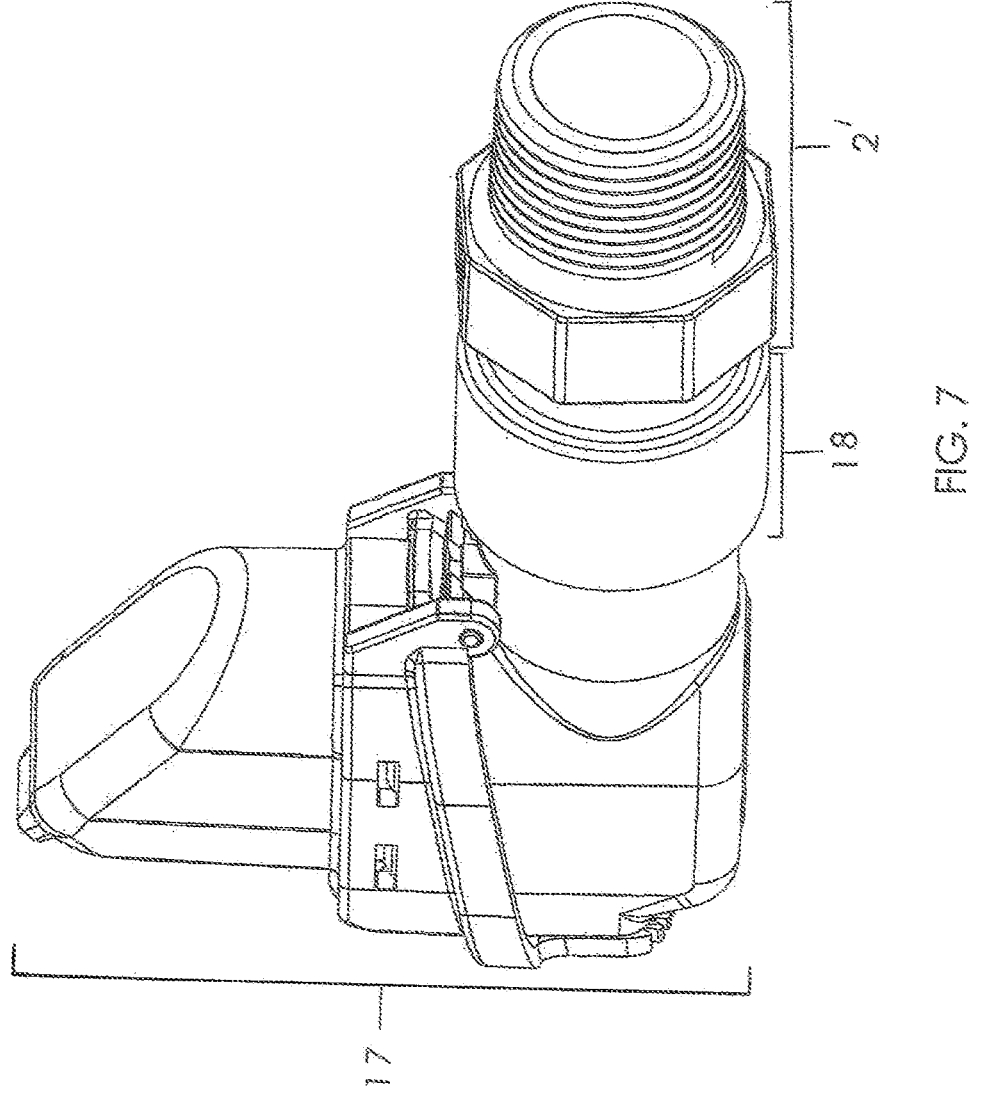

FIG. 7 is a side view of a second preferred embodiment of present invention fitting in one contemplated position of use where it has fluid communication with a shut-off switch via an extension piece, the fitting allowing easy release of the shut-off switch from its position of use for inspection, replacement, and/or maintenance purposes, the fitting in the second preferred embodiment showing a different shape and exterior surface configuration for its gripping section than is shown for the first preferred embodiment in FIGS. 1-6.

LIST OF COMPONENTS

1 Threaded Adapter Seal Invention (comprises a Sealing component 3 or other performing equivalent function, and a Fitting component 2, 2' or other performing equivalent function)

2 $1^{st}$ embodiment of the Fitting component of Threaded Adapter Seal 1 with its Gripping Section having a circular exterior configuration and seventeen Exterior Ridges 14

2' 2nd embodiment of the Fitting component of Threaded Adapter Seal 1 with its Gripping Section 5 having an octagonal exterior configuration and eight Exterior Ridges 14

3 Sealing component of Threaded Adapter Seal 1 (preferably, but not limited to, a circular O-ring. Its configuration must have a size and outline/arrangement corresponding to Indent 9)

4 Threaded Section of Adapter components 2 and 2'

5 Gripping Section of Adapter components 2 and 2'

6 Interior Wall of Threaded Section 4 (downward taper therein is preferred and shown in FIG. 6)

7 Interior Wall of Gripping Section 5 (slight downward taper therein is preferred and shown in FIG. 6)

8 Opening through the Distal end 15 of Gripping Section 5

9 Indent in the Radially-extending surface between Gripping Section 5 and the Externally-extending section 4 (configured to engage and improve the fit and sealing performance of sealing component 3, including blow-out prevention if overtightening of threaded section 4 occurs)

10 Distal end of Threaded Section 4

11 Angled Surface between Interior Wall 7 and Proximal End 12

12 Proximal end of the Interior Wall 6 in Threaded Section 4 of Fitting components 2 and 2'

13 Opening through the Distal end 10 of Externally-Threaded Section 4

14 Exterior Ridges of Gripping Section 5

15 Distal end surface of the Gripping Section 5 of Fitting components 2 and 2'

16 Radially-extending surface between Gripping Section 5 and Externally-Threaded Section 4 of Fitting components 2 and 2'

17 Shut-Off Switch (example of a shut-off switch usable with Threaded Adapter Seal components 2 and 2')

18 Extension Piece (usable between Shut-Off Switch 17 and Threaded Adapter Seal components 2 or 2')

DETAILED DESCRIPTION OF THE INVENTION

The present invention is a threaded adapter seal 1 comprising a fitting component (2, 2', or other) and a sealing component 3, the fitting component (2, 2', or other) having a gripping section 5 axially aligned with an opposed externally-threaded section 4. While the two most preferred embodiments of the fitting component (2 and 2') are shown herein, the gripping sections 5 of each embodiment have a different exterior surface configuration and a different number of exterior ridges 14, they are only provided for exemplary purposes, and it is not contemplated for the invention disclosed herein to be limited only to those specific surface configurations for its gripping section 5, and instead it should be contemplated foe the present invention to also include many variations, combinations, and equivalent gripping section 5 exterior structures that are not specifically described or illustrated in the invention disclosure herein. The external diameter dimension of gripping section 5 exceeds that of externally-threaded section 4, providing a radially extending surface between the two sections (4 and 5) where an indent 9 (or other depression, undercut, groove, channel or similar structural characteristic) is present to improve placement, fit, and performance of the sealing component 3 after adaptor component 2 installation. The sealing component 3 is preferably a circular O-ring, but not limited thereto as long as the outline/arrangement of sealing component 3 and indent 9 are complementary and corresponding to one another. Thus, the size and outline/arrangement of indent 9 should correspond to that of the sealing component 3, so that the present invention can provide its intended leak-preventing function and other important benefits. Improved fit of sealing component 3 relative to externally-threaded section 4 prevents its blow-out to one side should the externally-threaded section 4 become overtightened during its installation. A tapered design in fitting component 2 and/or a non-standard thread angle in externally-threaded section 4 also reduces the risk of installation damage to mating surfaces should overtightening occur. One contemplated use of threaded adapter seal 1 is connection of fluid-bearing tubular components, extensions, and other fluid-bearing or fluid detecting devices where the addition of a separable threaded connection is desired for maintenance or replacement purposes. Plastic materials and unitary molded construction of the present invention fitting component (2, 2', and other) are preferably used.

FIG. 1 is an exploded perspective view from one of the opposing ends of the most preferred embodiment of the present threaded adapter seal 1 invention, which shows a circular O-ring configuration for the sealing component 3 thereof separated from its intended position of use against a curved indent 9 in the radially-extending surface between the larger diameter gripping section 5 and the smaller diameter externally-threaded section 4 of the fitting component 2 shown. The configuration of indent 9 is a size and outline/arrangement corresponding to that of the sealing component 3. In contrast, FIG. 2 is a side section view of the fitting component 2 of the invention in FIG. 1, with two circles between the smaller diameter externally-threaded section 4 and the larger diameter gripping section 5 each on a different opposing side of the adaptor component 2 indicating the intended O-ring 3 positioning.

FIG. 3 is an enlarged side view of the fitting component 2 of the invention shown in FIGS. 1-2, while FIG. 4 is a perspective view of the distal end 10 of externally-threaded section 4 end of fitting component 2 of the threaded adapter seal invention 1 in FIGS. 1-3, that shows externally-threaded section 4 having a smaller diameter dimension than that of gripping section 5, and also identifies the distal end surface 10 of its externally-threaded section 4 and the opening 13 through it, the smooth interior wall 6 of externally-threaded section 4 and smooth interior wall 7 of gripping section 5, the curved indent 9 on the radially-extending surface 16 between the gripping section 5 and the externally-threaded section 4 of adaptor component 2, multiple exterior ridges 14 on the exterior of gripping section 5, and the opening 8 through the distal end of gripping section 5. In addition, FIG. 5 is a perspective view of the gripping component 5 of fitting section 2 in FIGS. 1-4, that shows some of the same invention features from an opposing point of view, with FIG. 5 showing gripping section 5 having a larger diameter dimension than that of externally-threaded section 4, and also identifies the distal end surface 15 of gripping section 5 and the opening 8 through it, the smooth interior wall 7 in gripping section 5 and the smooth interior wall 6 of externally-threaded section 4, the proximal end 12 of the fitting's externally-threaded section 4 (visible due to the diameter dimension difference between the externally-threaded and gripping sections), an angled surface 11 between proximal end 12 and the smooth interior wall 7 of gripping section 5, multiple exterior ridges 14 on gripping section 5, the opening 13 through the bottom surface distal end of externally-threaded section 4, and a small exterior component of the externally-threaded section 4 visible to the right of exterior ridges 14. The proximal end 12 of externally-threaded section 4 may act as a stop for a mating surface (not shown) aligned with the smooth interior wall 7 of gripping section 5, and angled surface 11 present to case the fit of a mating surface and prevent potentially damaging overtightening of a mating with interior wall 7. While not shown, in the alternative, the interior wall 7 of gripping section 5 could be configured for a threaded (or other) connection with fitting component 2.

Release of the externally-threaded section 4 of threaded adapter seal 1 from mating surfaces (not shown) during installation of threaded adapter seal 1 is preferably accomplished using hand-manipulation of the ridges 14 on the exterior surface of gripping section 5. Although a hand-manipulated tool (now shown) may also be used, hand manipulation directly of gripping section 5 is preferred to reduce a tendency toward overtightening and thread damage. The size, number, spaced-apart distance, and/or uniformity of ridges 14 in gripping section 5 to one another is not critical and may be different than that shown in the accompanying drawings as long as they fulfill their intended purpose of easy hand-manipulation by a user of the present invention during installation and removal from an installation site. The cross-sectional configuration of gripping section may also be different from the circular configuration shown in the accompanying drawings, such as but not limited to that of a hexagon or octagon. However, any other configuration used must be able to accommodate the presence of a circular indent (or equivalent) needed to engage the sealing component 3 used as a part of threaded sealing adapter 1.

FIG. 6 is a gripping section end view of the fitting 2 in FIGS. 1-5, showing more accurately the relative width dimensions in fitting 2. FIG. 6 shows the top surface of its gripping section and the opening through it, the smooth and downwardly-tapered interior walls preferred in the gripping section and the threaded section, the distal end of the fitting's threaded section, an angled surface between the distal end and the smooth interior wall of the gripping section, multiple exterior ridges associated with the gripping section, and the opening through the distal end of the externally-threaded section. In contrast, FIG. 7 is a is a side view of a second preferred embodiment of present invention fitting 2' in one contemplated position of use where it has fluid communication with a shut-off switch 17 via an extension piece 18, the fitting 2' allowing easy release of the shut-off switch 17 from its position of use for inspection, replacement, and/or maintenance purposes, the fitting 2' in the second preferred embodiment showing a different shape and exterior surface configuration for its gripping section 5 than is shown for the first preferred embodiment of Fitting 2 in FIGS. 1-6. As long as each embodiment of the present invention fitting component (2, 2', or other) herein has the opposed gripping 5 and externally-threaded sections 4 providing an indent 9 therebetween to improve placement, fit, and performance of its sealing component 3, and/or may also preferably have a non-standard thread angle in the range of 1.75 to 4 degrees compared to the standard thread angle of 1.73 of a component at an installation site intended for a threaded connection therewith, the goal of reduced fluid leaks in the connection of the present invention with fluid-transport conduit, pipe, or tubing will be met.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

I claim:

1. A device, comprising:
a shut-off switch having an extension piece;
a pan;
a fitting including a gripping section and a coupling section, wherein the gripping section includes a first tubular portion having a first outer side, a first inner side, a first end portion, and a second end portion, wherein the first end portion is open, wherein the first outer side hosts a set of ridges extending longitudinally between the first end portion and the second end portion, wherein the first outer side has a first diameter, wherein the first inner side defines a first inner cavity longitudinally extending along a first plane, wherein the first end portion is in fluid communication with the first inner cavity, wherein the coupling section includes a second tubular portion having a second outer side, a second inner side, a third end portion, a fourth end portion, and a wall, wherein the fourth end portion is open, wherein the second outer side hosts a set of threads extending longitudinally between the third end portion and the fourth end portion transverse to the set of ridges, wherein the wall spans between the second end portion and the third end portion such that the wall indents toward the first end portion away from the fourth end portion thereby forming an indent, wherein the second outer side has a second diameter, wherein the first diameter is greater than the second diameter, wherein the second inner side defines a second inner cavity longitudinally extending along a second plane, wherein the fourth end portion is in fluid communication with the second inner cavity, wherein the first inner cavity is in fluid communication with the second inner cavity; and
a ring extending within the indent, wherein the first end portion is configured to be positioned such that (a) the first end portion receives the extension piece of the shut-off switch, (b) the fourth end portion is in fluid communication with the shut-off switch via the second inner cavity, the third end portion, the second end portion, the first inner cavity, and the extension piece, and (c) the fourth end portion is threaded with the pan such that the ring seals against the pan to enable a fluid to flow from the pan to the shut-off switch such that the fluid avoids flowing further from the shut-off switch.

2. The device of claim 1, wherein the gripping section and the coupling section are monolithic.

3. The device of claim 1, wherein the first plane and the second plane are a single plane.

4. The device of claim 1, wherein the indent is curved toward the first end portion away from the fourth end portion.

5. The device of claim 1, wherein the ring is an O-ring.

6. The device claim 5, wherein the O-ring is circular.

7. The device of claim 1, wherein the set of threads has an angle ranging between 1.75 and 4 degrees.

8. The device of claim 1, wherein the second outer side is tapered inward along the set of threads between the third end portion and the fourth end portion.

9. The device of claim 1, wherein the first inner side is non-threaded.

10. The device of claim 1, wherein the second end portion or the third end portion includes an interior end portion that separates the gripping section from the coupling section and stops a tubular member when the tubular member is inserted into the gripping section.

11. The device of claim 10, wherein the indent indents toward the interior end portion.

12. The device of claim 10, wherein the interior end portion includes an angled surface.

13. The device of claim 1, wherein the second inner cavity is tapered inwardly from the third end portion to the fourth end portion.

14. The device of claim 1, wherein the first inner side is tapered inwardly from the first end portion toward the second end portion.

15. The device of claim 1, wherein each of the first inner side and the second inner side is tapered inwardly in a common direction.

16. The device of claim 1, wherein the gripping section has a first length between the first end portion and the second end portion, wherein the coupling section has a second length between the third end portion and the fourth end portion, wherein the first length is lesser than the second length.

17. A method, comprising:
causing a fitting to be accessed, wherein the fitting including a gripping section and a coupling section, wherein the gripping section includes a first tubular portion having a first outer side, a first inner side, a first end portion, and a second end portion, wherein the first end portion is open, wherein the first outer side hosts a set of ridges extending longitudinally between the first end portion and the second end portion, wherein the first outer side has a first diameter, wherein the first inner side defines a first inner cavity longitudinally extending along a first plane, wherein the first end portion is in fluid communication with the first inner cavity, wherein the coupling section includes a second tubular portion having a second outer side, a second inner side, a third end portion, a fourth end portion, and a wall, wherein the fourth end portion is open, wherein the second outer side hosts a set of threads extending longitudinally between the third end portion and the fourth end portion transverse to the set of ridges, wherein the wall spans between the second end portion and the third end portion such that the wall indents toward the first end portion away from the fourth end portion thereby forming an indent, wherein the second outer side has a second diameter, wherein the first diameter is greater than the second diameter, wherein the second inner side defines a second inner cavity longitudinally extending along a second plane, wherein the fourth end portion is in fluid communication with the second inner cavity, wherein the first inner cavity is in fluid communication with the second inner cavity, and a ring extending within the indent; and
causing the first end portion to be positioned such that (a) the first end portion receives an extension piece of a shut-off switch, (b) the fourth end portion is in fluid communication with the shut-off switch via the second inner cavity, the third end portion, the second end portion, the first inner cavity, and the extension piece, and (c) the fourth end portion is threaded with a pan such that the ring seals against the pan to enable a fluid to flow from the pan to the shut-off switch such that the fluid avoids flowing further from the shut-off switch.

18. A method, comprising:

supplying a fitting to an end user, wherein the fitting including a gripping section and a coupling section, wherein the gripping section includes a first tubular portion having a first outer side, a first inner side, a first end portion, and a second end portion, wherein the first end portion is open, wherein the first outer side hosts a set of ridges extending longitudinally between the first end portion and the second end portion, wherein the first outer side has a first diameter, wherein the first inner side defines a first inner cavity longitudinally extending along a first plane, wherein the first end portion is in fluid communication with the first inner cavity, wherein the coupling section includes a second tubular portion having a second outer side, a second inner side, a third end portion, a fourth end portion, and a wall, wherein the fourth end portion is open, wherein the second outer side hosts a set of threads extending longitudinally between the third end portion and the fourth end portion transverse to the set of ridges, wherein the wall spans between the second end portion and the third end portion such that the wall indents toward the first end portion away from the fourth end portion thereby forming an indent, wherein the second outer side has a second diameter, wherein the first diameter is greater than the second diameter, wherein the second inner side defines a second inner cavity longitudinally extending along a second plane, wherein the fourth end portion is in fluid communication with the second inner cavity, wherein the first inner cavity is in fluid communication with the second inner cavity, and a ring extending within the indent; and causing the end user to position the first end portion such that (a) the first end portion receives an extension piece of a shut-off switch, (b) the fourth end portion is in fluid communication with the shut-off switch via the second inner cavity, the third end portion, the second end portion, the first inner cavity, and the extension piece, and (c) the fourth end portion is threaded with a pan such that the ring seals against the pan to enable a fluid to flow from the pan to the shut-off switch such that the fluid avoids flowing further from the shut-off switch.

* * * * *